(12) United States Patent  
Morin et al.

(10) Patent No.: US 11,941,525 B2
(45) Date of Patent: *Mar. 26, 2024

(54) SYSTEM AND METHOD FOR VALIDATING DATA

(71) Applicant: The Toronto-Dominion Bank, Toronto (CA)

(72) Inventors: Nicholas Victor Laurence Morin, Toronto (CA); Yunyu Kuang, Waterloo (CA); Jathavi Shanmuganantham, Scarborough (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/930,774

(22) Filed: Sep. 9, 2022

(65) Prior Publication Data
US 2023/0004758 A1    Jan. 5, 2023

Related U.S. Application Data

(63) Continuation of application No. 16/778,110, filed on Jan. 31, 2020, now Pat. No. 11,475,251.

(51) Int. Cl.
*G06N 20/00* (2019.01)
*G06F 18/21* (2023.01)
(Continued)

(52) U.S. Cl.
CPC ........... *G06N 3/08* (2013.01); *G06F 18/2155* (2023.01); *G06F 18/2178* (2023.01); *G06N 7/01* (2023.01); *G06N 20/00* (2019.01); *G06Q 40/125* (2013.12)

(58) Field of Classification Search
CPC ............ G06N 3/08; G06N 20/00; G06N 7/01; G06Q 40/125
See application file for complete search history.

(56) References Cited

U.S. PATENT DOCUMENTS 8,401,987 B2 * 3/2013 Agrawal .................. G06N 5/02
                                                                 706/45
10,395,215 B2   8/2019 Rope
(Continued)

FOREIGN PATENT DOCUMENTS

WO    2013/164278 A1   11/2013

OTHER PUBLICATIONS

Chua, C. et al., "An Integrated Data Mining System to Automate Discovery of Measures of Association"; Proceedings of the 33rd Hawaii International Conference on System Sciences; 2000; http://citeseerx.ist.psu.edu/viewdoc/download?doi=10.1.1.123.9738&rep1type=pdf.

(Continued)

*Primary Examiner* — Nadeem Iqbal
(74) *Attorney, Agent, or Firm* — CPST Intellectual Property Inc.; Brett J. Slaney

(57) ABSTRACT

A system and method are provided for validating data. The method is executed by a device having a data interface coupled to a processor and includes obtaining a validation set comprising at least one validation case, each validation case comprising at least one test condition. The method also includes obtaining, via the data interface, at least one data set to be validated using the validation set. The method also includes applying the validation set to the at least one data set to validate the data in the data set by, for each record in the at least one data set, validating a value in the record according to the at least one test condition. The method also includes outputting a validation result for each record.

20 Claims, 9 Drawing Sheets

(51) Int. Cl.
*G06F 18/214* (2023.01)
*G06N 3/08* (2023.01)
*G06N 7/01* (2023.01)
G06Q 40/12 (2023.01)

(56) References Cited

U.S. PATENT DOCUMENTS

| | | | |
|---|---|---|---|
| 11,475,251 B2 * | 10/2022 | Morin | G06F 18/2155 |
| 2004/0093261 A1 | 5/2004 | Jain | |
| 2007/0147685 A1 | 6/2007 | Ericson | |
| 2010/0246999 A1 | 9/2010 | Tillberg et al. | |

OTHER PUBLICATIONS

Allam, Rasha M. et al.; "Assessment of Statistical Methodologies and Pitfalls of Dissertations Carried Out at National Cancer Institute, Cairo University"; Asian Pac J. Cancer Prev, 18(1);2017;pp. 231 to 237; https://www.ncbi.nlm.nih.gov/pmc/articles/PMC5563106/.

Nesvizhskii, Alexey I. et al.; Analysis, statistical validation and dissemination of large-scale proteomics datasets generated by tandem MS; DDT vol. 9, No. 4; Feb. 2004; https://www.stat.purdue.edu/~doerge/BIOINFORM.D/FALL06/NesvizhskiiAebersold-DDT04.pdf.

* cited by examiner

SYSTEM AND METHOD FOR VALIDATING DATA

CROSS-REFERENCE TO RELATED APPLICATION(S)

This application is a continuation of U.S. patent application Ser. No. 16/778,110 filed Jan. 31, 2020, the contents of which are incorporated herein by reference in their entirety.

TECHNICAL FIELD

The following relates generally to validating data.

BACKGROUND

Data that is generated for or by a process, and held or used by an organization, may be analyzed for various purposes such as to generate statistical reports, market insights, operational data, etc. Large quantities of statistical data may be generated by the organization during a period of time, e.g., on a quarterly basis. These large quantities of data may also need to be reviewed in a timely manner, e.g., to spot errors in the data and to flag or rectify those errors.

It is found that in many cases these large quantities of data are reviewed manually, e.g., during testing cycles. Such a manual review is time consuming and can be labor intensive and inefficient. These testing and review cycles may also introduce significant delays in identifying an issue with the source of the data, by which time subsequent data may have been generated with the same or similar errors.

BRIEF DESCRIPTION OF THE DRAWINGS

Embodiments will now be described with reference to the appended drawings wherein:

FIG. 6 is a flow diagram illustrating an example of an example of computer executable instructions for.

FIG. 7 is a flow diagram of an example of computer executable instructions for.

DETAILED DESCRIPTION

Figure 1:
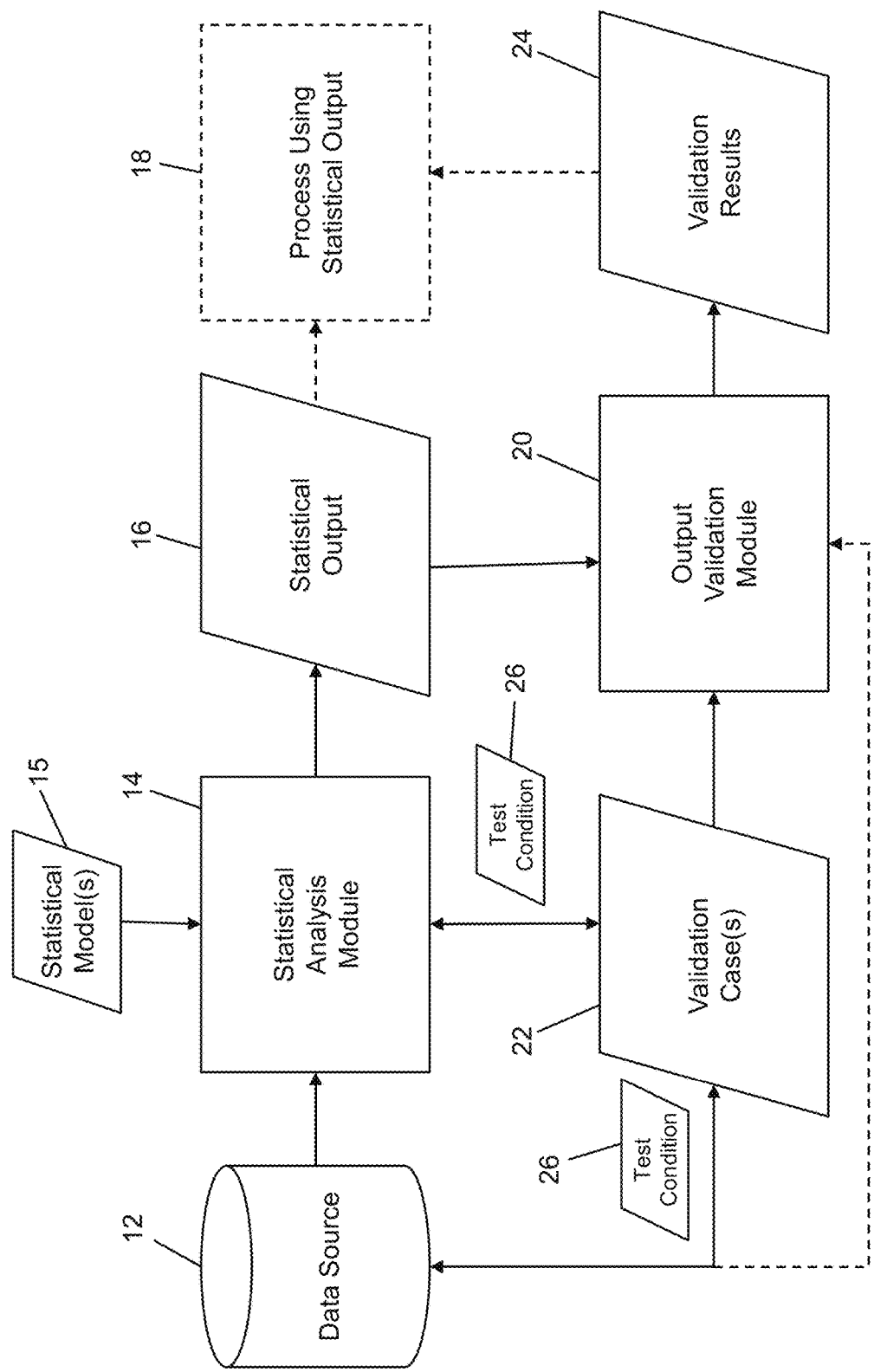
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

A system, devices and a process are provided to validate the results of statistical analyses that can eliminate at least some manual review that may be required on a periodic basis. The outputs of a statistical model (e.g., a scoring model) or any consistent data output can be analyzed using the process to flag problems and identify errors in the statistical results to enable an organization to investigate failures, e.g., via a notification, alert, or by interrupting a process that uses the results. The methodology described in greater detail below can also be used in a testing tool such that as statistical models are built and perfected, the testing tool can be used to determine whether the results are trending in the correct direction.

In an implementation, the details to be validated in the data may be determined/defined in advance, prior to applying an automated validation process. Cases to be validated can be obtained from a possible unlimited number of sources. Statistical datasets to be validated may also be obtained from a possible unlimited number of sources. In one example, a dual looping structure may then be applied to validate the statistical data, with the output being a pass/fail result for each record or portion of the data that is analyzed.

The methodology can also be adapted for a completely automated solution, in which the system can automatically derive the validation cases from existing statistical data. In the completely automated solution, details to be validated may be generated based on existing data sets that are made available to the process, which can be validated from a possible unlimited number of sources. The dual looping structure may also be applied to validate the statistical data and the pass/fail results can be output as feedback to the user, e.g., using a notification, alert, or process instructions such as an interruption or fault.

The automated process may therefore analyze the results of an existing process to validate those results. The methodology can also be applied to incoming data that has not yet been statistically analyzed. Machine learning may also be used to train the system to determine the attributes of the data to be validated, in order to generate and improve the automated creation of validation sets.

The process described herein can be applied to financial data (e.g., to determine how much capital to set aside according to regulatory requirements), as well as other types of data such as medical test results, research test data, or other statistical data that is to be validated.

Certain example systems and methods described herein enable data such as statistical output data to be validated. In one aspect, there is provided a device for validating data. The device includes a processor, a data interface coupled to the processor, and a memory coupled to the processor. The memory stores computer executable instructions that when executed by the processor cause the processor to obtain, via the data interface, at least one data set to be validated using a validation set determined according to at least one test condition, wherein the at least one dataset is an output of at least one statistical analysis on at least one input data set; apply the validation set to the at least one data set to validate the data in the data set by, for at least one record in the at least one data set, validating the record according to the at least one test condition; and output a validation result for the data set.

In another aspect, there is provided a method of validating data. The method is executed by a device having a data interface coupled to a processor and includes obtaining, via the data interface, at least one data set to be validated using a validation set determined according to at least one test condition, wherein the at least one dataset is an output of at least one statistical analysis on at least one input data set; applying the validation set to the at least one data set to validate the data in the data set by, for at least one record in the at least one data set, validating the record according to the at least one test condition; and outputting a validation result for the data set.

In another aspect, there is provided non-transitory computer readable medium for validating data. The computer readable medium includes computer executable instructions for obtaining, via the data interface, at least one data set to be validated using a validation set determined according to at least one test condition, wherein the at least one dataset is an output of at least one statistical analysis on at least one input data set; applying the validation set to the at least one data set to validate the data in the data set by, for at least one record in the at least one data set, validating the record according to the at least one test condition; and outputting a validation result for the data set.

In certain example embodiments, at least one validation case can be automatically derived by obtaining a sample data set, analyzing the sample data set, and identifying the at least one test condition from the analyzed sample data set.

In certain example embodiments, at least one validation case can be derived by providing a user interface to enable manual entry of the at least one test condition.

In certain example embodiments, at least one validation case can be obtained from a source, the source having previously derived the at least one test condition.

In certain example embodiments, the device can obtain the sample data set, analyze the sample data set, and automatically identify all test conditions to be validated for the at least one data set to validate. The sample data set can be analyzed by applying an automated process that uses a model derived using a machine learning process.

In certain example embodiments, a notification can be generated indicative of at least one failure to trigger an investigation of the data set.

In certain example embodiments, validating the value in the record can include accessing a first record to be validated, incrementing through each of the at least one test condition to be validated for the first record and, for a second and any additional record to be validated, incrementing to a next record to increment through each of the at least one test condition. The validation results can include a pass or fail indication output as the validating increments through the values.

In certain example embodiments, the data set can be generated using financial data. In certain example embodiments, each data set can include statistical results associated with use of a statistical model.

In certain example embodiments, each data set can include incoming data to a process.

FIG. 1 illustrates an exemplary computing environment 10 in which data from a data source 12 is processed, analyzed or otherwise examined by a statistical analysis module 14. In this exemplary environment 10, the statistical analysis module 14 is operated by a device (not shown) having a processor, memory, and an interface to or with the data source 12 and obtains or receives data sets from the data source 12 via such an interface. The statistical analysis module 14 examines the data to perform a statistical or other data analysis or data processing task to generate a statistical output 16 such as a summary, report, or notification displayed in a GUI of a software program used by an organization or individual. The statistical output 16 can take various forms dependent upon the requirements or preferences of the application in which the statistical analysis module 14 is being used.

The statistical analysis may be done for internal monitoring or reporting for the organization or in response to a request, audit or other internal or external process 18 that uses the statistical output 16. For example, the process 18 may include generating a model scoring report that uses internal and/or external data and is subsequently reported to an external authority or internal body, e.g., analyzing credit card balances, loans, and other customer borrowing activity to determine how much capital needs to be allocated to satisfy a regulatory requirement. The statistical analysis module 14 may be provided with, receive or otherwise obtain one or more statistical models 15 that define what or how to analyze the data from the data source 12 for a particular analysis.

It can be appreciated that the computing environment 10 shown in FIG. 1 can be adapted to be integrated into any computing system, device, or platform, including an existing organization such as a financial institution. Other types of data may also be analyzed within a computing environment 10 such as that shown in FIG. 1, for example, medical testing data, research results, or any other statistical output 16 for which the results can be validated by testing or otherwise examining one or more test conditions such as ranges, upper or lower thresholds, etc.

Also shown in the computing environment 10 illustrated in FIG. 1 is an output validation module 20 that can be integrated or interfaced with or otherwise coupled to the statistical analysis module 14 in order to validate the statistical output 16. It can be appreciated that the output validation module 20 may be operated by a device (not shown) having a processor, memory, and an interface to or with the statistical output 16 and obtains or receives data sets from the statistical analysis module 14 or a memory device storing the statistical output 16 via such an interface. The statistical analysis module 14 and output validation module 20 can be hosted or provided by separate devices or systems or can be integrated into the same device or system. For example, the output validation module 20 can be provided by a separate service or entity that can serve multiple entities that operate or control operation of a statistical analysis module 14 to provide a validation e.g., as a service.

The output validation module 20 obtains the statistical output 16, e.g., as a number of records in a data set, and analyzes the data against one or more validation cases 22 as discussed in greater detail below. The validation cases 22 are obtained, defined, or automatically determined according to one or more test conditions 26. The test conditions 26 can be determined from or by the statistical analysis module 14, e.g., based on the type of model 15, type of data, an objective of the analysis, the expected results, etc. The test conditions 26 can also be determined from or by analyzing the data source 12 directly.

The output validation module 20 can be coupled to the statistical output module 14 to perform a parallel validation process or, as illustrated using dashed lines in FIG. 1, to intercept the statistical output 16 prior to use of the output 16 by the process 18. The output validation module 20 may therefore generate validation results 24 that can be used to provide feedback, alerts, notifications, or control over the execution of the process 18. For example, the output validation module 20 can be inserted or coupled to a statistical analysis workflow (as illustrated in FIG. 1) to validate the statistical output 16 periodically or in real-time as the output 16 becomes available and prior to using or relying on the statistical output 16 in the process. In one example scenario, the process 18 may include generating a report for an auditor with the validation process being used to confirm the statistical results prior to submitting the report to the auditor, which may also include a feedback mechanism to have certain errors in data points or process operations fixed.

It can be appreciated that the computing environment 10 shown in FIG. 1 may also be utilized for validating the models 15 as they are being built or trained such that the results are analyzed and validated prior to releasing the model 15 for production. It can also be appreciated that the output validation module 20 can also be used to examine incoming data that may or may not have been statistically analyzed by the statistical analysis module 14. That is, the data source 12 can be directly fed into the output validation module 20 as illustrated in dashed lines in FIG. 1, to enable the contents of the data source 12 to be validated directly. For example, the data source 12 may include externally generated data that provides what can be considered "statistical" values that can be directly analyzed and do not necessarily require an additional statistical analysis.

Figure 2:
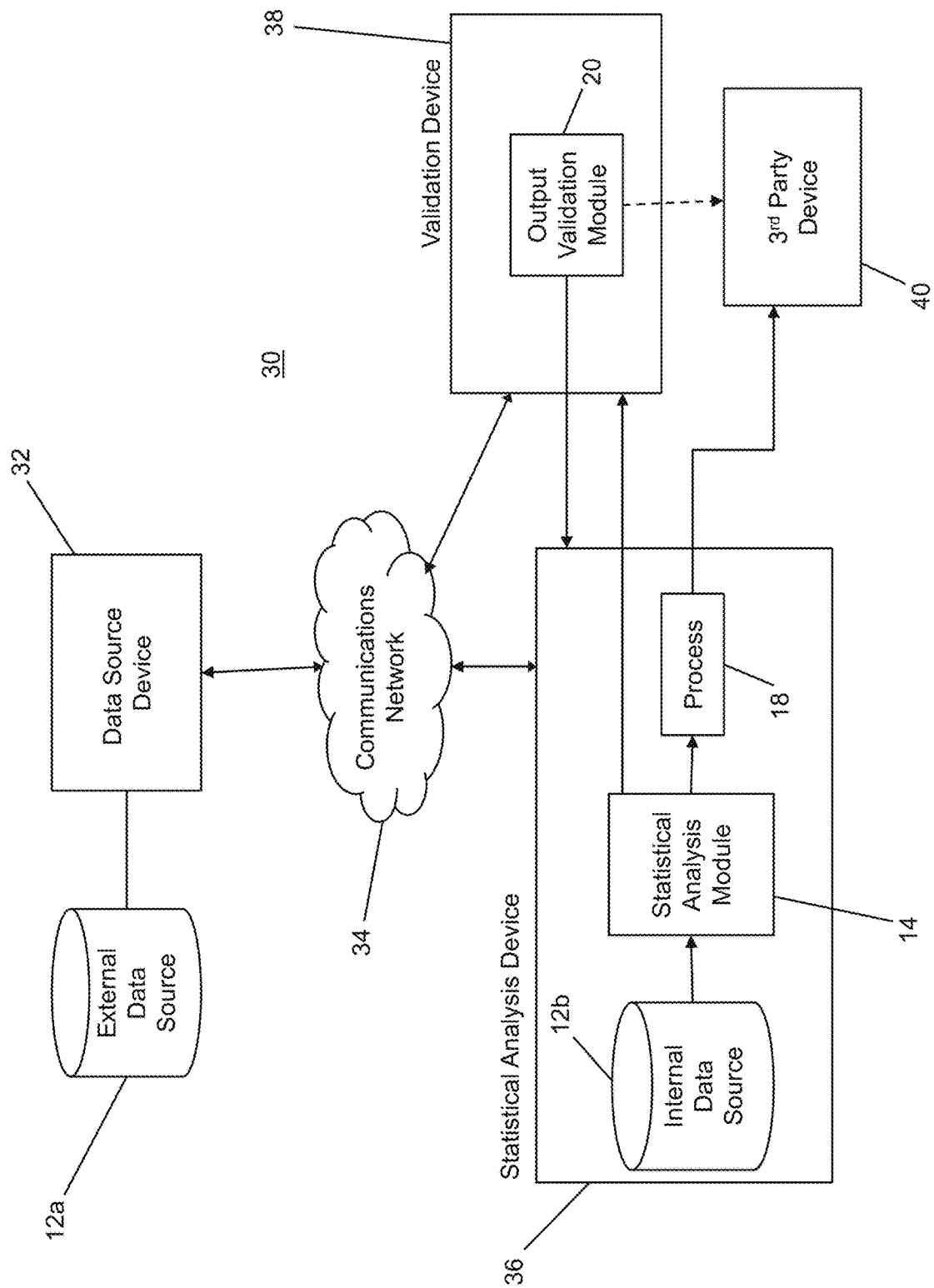
FIG. 2 is a schematic diagram of another example computing environment.

FIG. 2 illustrates another exemplary computing environment 30 to which the configuration shown in FIG. 1 has been adapted. In one aspect, the computing environment 30 may include a statistical analysis device 36, one or more data source devices 32 providing or otherwise having access to external data sources 12a, and a communications network 34 connecting one or more components of the computing environment 30. The computing environment 30 may also include one or more validation devices 38. In the example shown in FIG. 2, the validation device 38 receives data via the statistical analysis device 36 after the data has undergone a statistical analysis by a statistical analysis module 14, but can also access an external data source 12a via the communications network 34 to directly validate one more data sets from the external data source 12a. In one example, the validation device 38 may be associated with another organization that relies on the data after having been processed by the statistical analysis device 36. The devices 36, 38 may also be part of the same organization, and/or may be integrated into a single device (not shown).

The computing environment 30 may also include one or more $3^{rd}$ party devices 40. The $3^{rd}$ party device 40 may be considered similar to the devices 36, 38 but in this example does not necessarily process or analyze the data. For example, the $3^{rd}$ party device 40 may correspond to a member of the public that consumes a report, score, or result generated by the process 18, or may correspond to an auditor or other external organization that relies on the statistical output 16.

It can be appreciated that the $3^{rd}$ party device 40 may also receive data that has been validated by the validation device 38 (as illustrated in dashed lines in FIG. 2). It can also be appreciated that the validation device 38 and $3^{rd}$ party device 40 may include an application programming interface (API) or other interface mechanism or module for interfacing with the statistical analysis device 36 (or each other) either directly or via the network 34. Similarly, the statistical analysis device 36 may include an API or other interface mechanism or module for interfacing with the external data source 12a via the data source device 32. The data source device 32 is shown to illustrate one example in which an entity or organization responsible for the external data source 12a communicates with the statistical analysis device 36 and/or the validation device 38 via the network 34. However, in other configurations, the statistical analysis device 36 and/or validation device 38 may be capable of accessing the external data source 12a directly, without communicating via another device. It can be appreciated that a statistical analysis device 36 may in another scenario become a validation device 38 and vice versa. As such, the scenario and configuration depicted in FIG. 2 provides one example for the sake of illustration.

As illustrated in FIG. 2, the statistical analysis device 36 may also include or have access to an internal data source 12b, that is, data that is generated or otherwise made available within a same entity or organization. For example, data generated in one business unit of a financial institution may be used in other downstream processes 18 and therefore could benefit from execution of the statistical analysis module 14 prior to using the internally sourced data 12b. In one embodiment, the statistical analysis device 36 may be one or more computer systems configured to process and store information and execute software instructions to perform one or more processes consistent with the disclosed embodiments. Similarly, the validation device 38 can have, or have access to, the internal data source 12b shown in FIG. 2 or its own internal data source 12b (not shown).

The statistical analysis device 36 and/or validation device 38 may also include or be a component or service provided by a financial institution system (e.g., commercial bank) that provides financial services accounts to users, processes financial transactions associated with those financial service accounts, and analyzes statistical data to inform investors, customers, and the public generally. Details of such a financial institution system have been omitted for clarity of illustration. The statistical analysis device 36 and/or validation device 38 may also include or be a component or service provided by other types of entities and organizations, such as government bodies and private enterprises that would benefit from checking the integrity of data which they did not necessarily generate.

In certain aspects, data source device 32 (that provides or provides access to the external source of data 12a), statistical analysis device 36, and/or validation device 38 can include, but is not limited to, a personal computer, a laptop computer, a tablet computer, a notebook computer, a hand-held computer, a personal digital assistant, a mobile phone, an embedded device, a smart phone, a virtual reality device, an augmented reality device, third party portals, and any additional or alternate computing device, and may be operable to transmit and receive data across communication network 34.

Communication network 34 may include a telephone network, cellular, and/or data communication network to connect different types of devices as will be described in greater detail below. For example, the communication network 24 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

The computing environment 30 may also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public and private keys in a PKI), and perform other cryptographic operations that are required or desired for particular applications of the statistical analysis device 36, validation device 38, $3^{rd}$ party device 40, and data source device 32. The cryptographic server may be used to protect the data or results of the data by way of encryption for data protection, digital signatures or message digests for data integrity, and by using digital certificates to authenticate the identity of the users and devices within the computing environment 30, to inhibit data breaches by adversaries. It can be appreciated that various cryptographic mechanisms and protocols can be chosen and implemented to suit the constraints and requirements of the particular deployment of the computing environment 30 as is known in the art.

Figure 3:
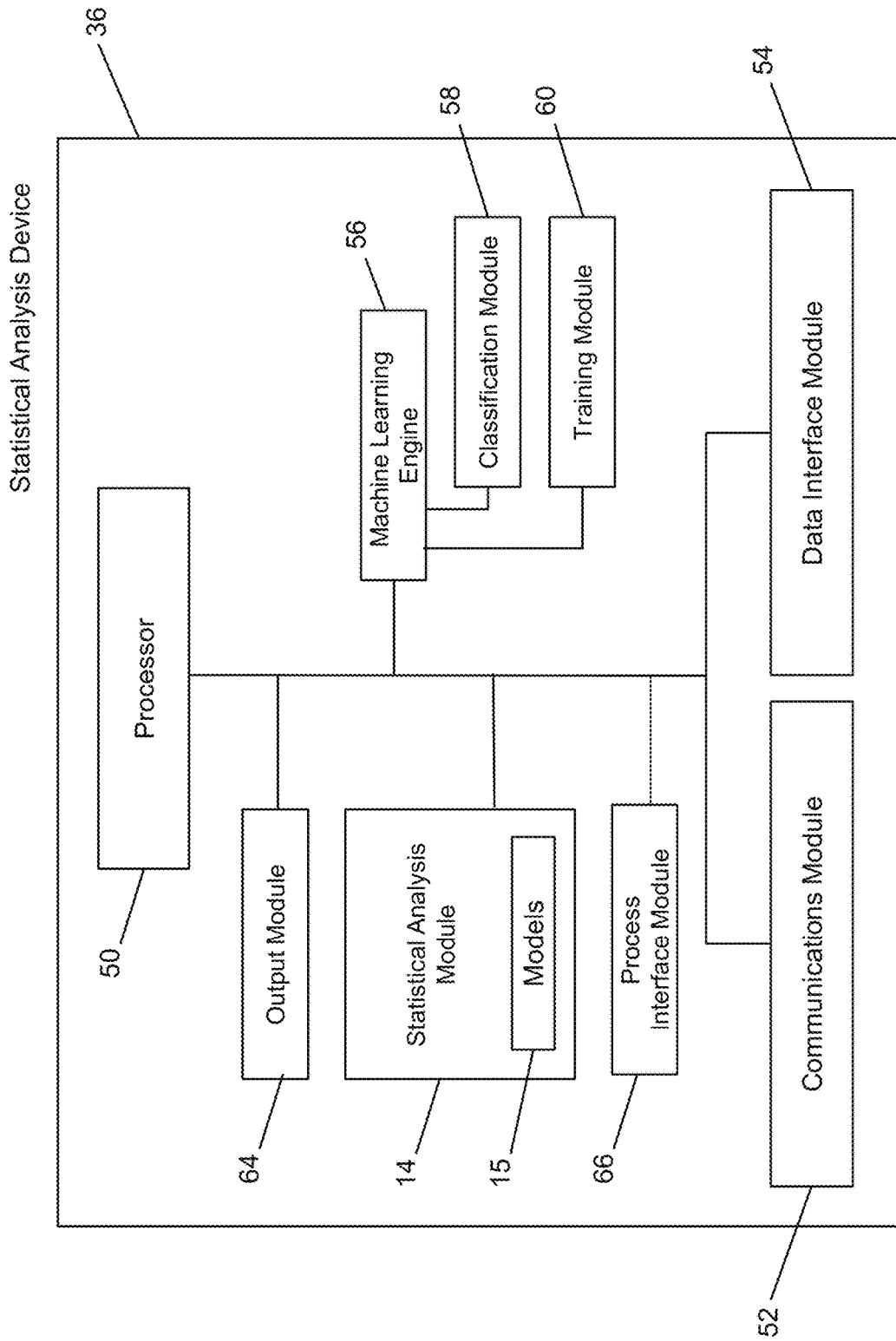
FIG. 3 is a block diagram of an example configuration of a statistical analysis device.
Figure 4:
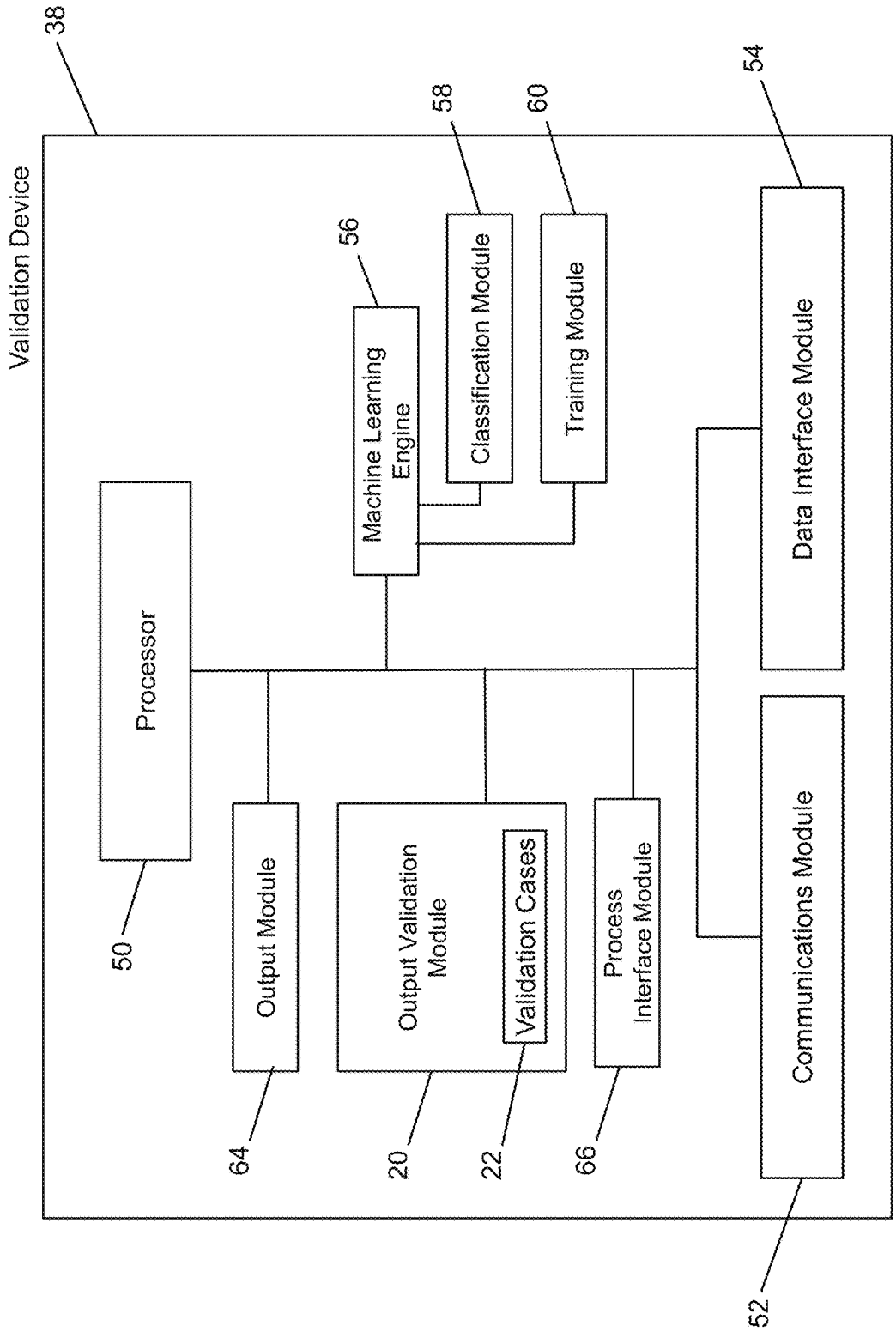
FIG. 4 is a block diagram of an example configuration of a validation device.

In FIG. 3, an example configuration of the statistical analysis device 36 is shown and in FIG. 4, an example configuration of the validation device 38 is shown. As can be appreciated from these figures, the devices 36, 38 include several similar components, which will be described once for brevity. Turning first to FIG. 3, in certain embodiments, the statistical analysis device 36 may include one or more processors 50, a communications module 52, and a data interface module 54 for interfacing with the external data source 12a and/or internal data source 12b to retrieve and store data. Communications module 52 enables the statistical analysis device 36 to communicate with one or more other components of the computing environment 30, such as data source device 32, validation device 38, $3^{rd}$ party device 40 (or one of its components), via a bus or other communication network, such as the communication network 34. While not delineated in FIG. 3, the statistical analysis device 36 includes at least one memory or memory device that can include a tangible and non-transitory computer-readable medium having stored therein computer programs, sets of instructions, code, or data to be executed by processor 50. FIG. 3 illustrates examples of modules, tools and engines stored in memory on the statistical analysis device 26 and operated by the processor 50. It can be appreciated that any of the modules, tools, and engines shown in FIG. 3 may also be hosted externally and be available to the statistical analysis device 36, e.g., via the communications module 52.

In the example embodiments shown in FIGS. 3 and 4, the statistical analysis device 36 and validation device 38 include a machine learning engine 56, a classification module 58, a training module 60, an output module 64, and a process interface module 66. Referring to FIG. 3, the statistical analysis device 36 also includes the statistical analysis module 14 storing or having access to one or more statistical models 15. Similarly, as shown in FIG. 4, the validation device 38 also includes the output validation module 20 and may store one or more validation cases 22.

The machine learning engine 56 is used by the statistical analysis module 14 or output validation module 20 to generate and train statistical models 15 or validation cases 22 to be used in either the statistical analyses being conducted, building or refining the models 15, determining validation cases 22, and performing a data validation process. The statistical analysis module 14 or output validation module 20 may utilize or otherwise interface with the machine learning engine 56 to both classify data currently being analyzed to generate the statistical models 15 or validation cases 22, and to train classifiers using data that is continually being processed and accumulated by the statistical analysis device 36 and validation device 38.

The machine learning engine 56 may also perform operations that classify the data from the data source(s) 12a/12b in accordance with corresponding classifications parameters, e.g., based on an application of one or more machine learning algorithms to the data. The machine learning algorithms may include, but are not limited to, a one-dimensional, convolutional neural network model (e.g., implemented using a corresponding neural network library, such as Keras®), and the one or more machine learning algorithms may be trained against, and adaptively improved using, elements of previously classified profile content identifying expected datapoints. Subsequent to classifying the data, the machine learning engine 56 may further process each data point to identify, and extract, a value characterizing the corresponding one of the classification parameters, e.g., based on an application of one or more additional machine learning algorithms to each of the data points. By way of the example, the additional machine learning algorithms may include, but are not limited to, an adaptive natural language processing algorithm that, among other things, predicts starting and ending indices of a candidate parameter value within each data point, extracts the candidate parameter value in accordance with the predicted indices, and computes a confidence score for the candidate parameter value that reflects a probability that the candidate parameter value accurately represents the corresponding classification parameter. As described herein, the one or more additional machine learning algorithms may be trained against, and adaptively improved using, the locally maintained elements of previously classified data. Classification parameters may be stored and maintained using the classification module 58, and training data may be stored and maintained using the training module 60.

In some instances, classification data stored in the classification module 58 may identify one or more parameters, e.g., "classification" parameters, that facilitate a classification of corresponding elements or groups of recognized data points based on any of the exemplary machine learning algorithms or processes described herein. The one or more classification parameters may correspond to parameters that can identify expected and unexpected data points for certain types of data.

In some instances, the additional, or alternate, machine learning algorithms may include one or more adaptive, natural-language processing algorithms capable of parsing each of the classified portions of the data being examined and predicting a starting and ending index of the candidate parameter value within each of the classified portions. Examples of the adaptive, natural-language processing algorithms include, but are not limited to, natural-language processing models that leverage machine learning processes or artificial neural network processes, such as a named entity recognition model implemented using a SpaCy® library.

Examples of these adaptive, machine learning processes include, but are not limited to, one or more artificial, neural network models, such as a one-dimensional, convolutional neural network model, e.g., implemented using a corresponding neural network library, such as Keras®. In some instances, the one-dimensional, convolutional neural network model may implement one or more classifier functions or processes, such a Softmax® classifier, capable of predicting an association between a data point and a single classification parameter and additionally, or alternatively, multiple classification parameters.

Based on the output of the one or more machine learning algorithms or processes, such as the one-dimensional, convolutional neural network model described herein, machine learning engine 56 may perform operations that classify each of the discrete elements of the data being examined as a corresponding one of the classification parameters, e.g., as obtained from classification data stored by the classification module 58.

The outputs of the machine learning algorithms or processes may then be used by the statistical analysis module 14 to generate and train the models 15 and to use the models 15 to determine if data points in the current data being examined are expected or unexpected. The outputs of the machine learning algorithms or processes may also be used by the output validation module 20 to generate and train validation cases 22 to determine if data points in the current data being examined are expected or unexpected.

Referring again to FIGS. 3 and 4, the output module 64 may be used to provide one or more outputs based on the results generated by the statistical analysis module 14 or output validation module 20. Example outputs include a visual output in a GUI; a flag, alert, notification, or message in a process using (or about to use) the data being analyzed and/or validated; or a process instruction operable to pause, interrupt or halt the process in view of the results of the data validation as discussed above. The output module 64 may be configured to interface with the process 18 via the process interface module 66. The statistical analysis module 14 and output validation module 20 may also be configured to interface with the process 18 via the process interface module 66. The output module 64 and process interface module 66 may be embodied as APIs when interfacing with software-based processes 18 or may include a combination of software and hardware when interfacing with processes 18 that have hardwired or software/hardware-type interfaces. The statistical analysis module 14 and output validation module 20 may be programmed to translate between multiple protocols in order to interface with other components to provide such outputs and such translation can occur within the statistical analysis module 14, output data validation module 20 and/or the output module 64 or process interface module 66. It can be appreciated that the functionality provided by the output module 64 and process interface module 66 are delineated as shown in FIGS. 3 and 4 for illustrative purposes and such functionality may also be integrated together or into the statistical analysis module 14 or output data validation module 20 in other example embodiments.

While not shown in the figures, the $3^{rd}$ party device 40 may also be configured in a manner similar to the devices 36, 38 to enable the $3^{rd}$ party device 40 to report, publish, or otherwise use the data from a data source 12 that has been processed by either or both the devices 36, 38.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the data source device 32, statistical analysis device 36, validation device 38, or $3^{rd}$ party device 40, or accessible or connectable thereto. Any application or module herein described may be implemented using computer readable/executable instructions that may be stored or otherwise held by such computer readable media.

Figure 5:
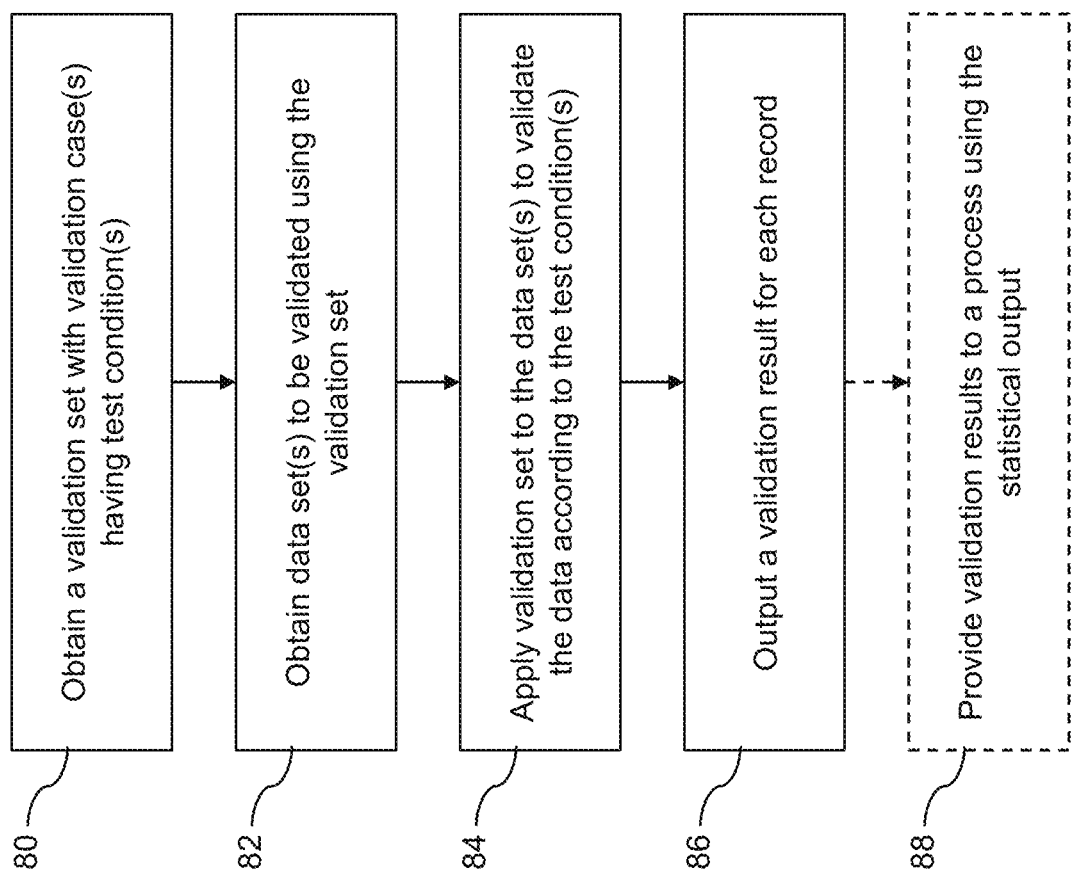
FIG. 5 is a flow diagram illustrating an example of computer executable instructions for validating data.

Referring to FIG. 5, an example illustrating computer executable operations executed by the output validation module 20 in performing a data validation process is shown, for example in validating data such as statistical output 16 generated by the statistical analysis module 14. At block 80, the output validation module 20 obtains a validation set with one or more validation cases 22. Each validation case 22 includes at least one test condition 26, which defines what in the data is to be validated. For example, if a value in the data set should be within a predetermined range in order to be valid, the test condition 26 can define that range and the validation case 22 apply that condition. The terms validation set, validation case, and test condition are used in this granularity to provide for flexible and reusable modules, however, a validation set may instead define one or more test conditions or the test condition may itself be the validation case or validation set. On the other hand, different validation cases can be defined with different test conditions that can be assembled in different ways for different types of data sets associated with different types of statistical analyses and/or statistical models 15. For example, Test Case A may include test condition 1 and test condition 2 while Test Case B includes test condition 1 and test condition 3. Test Case A may be selected for data from one region while Test Case B is selected for another region. In this way, different test cases 22 can be defined, reused and applied modularly.

At block 82, the output validation module 20 obtains the one or more data sets to be validated using the validation set. This may include, for example, communicating with the statistical analysis device 36 via the process interface module 66 of the validation device 38 to obtain the statistical output 16 generated by the statistical analysis module 14 and which is to be validated.

At block 84, the output validation module 20 applies the validation set to the one or more data sets that are being validated, to validate the data in the one or more data sets according to the test conditions 26. The validation set can be applied to the data being validated by iterating through data fields, rows, columns or other records according to what is being validated. An example of the application of a validation set is described in greater detail below.

At block 86, the output validation module 20 outputs a validation result 24 for each record that is validated, with an indication of whether the value that was examined passed or failed according to the test condition(s) 26. For example, if the value contained in a record is outside of a range that is expected given some other condition or variable, the validation result 24 for that record would fail. The outputting of the validation result at block 86 may include generating a summary or list of the records with the corresponding result, e.g., within a user interface.

At block 88, the validation results 24 may optionally be provided to a process 18 that uses the statistical output 16 as a validation feedback mechanism. For example, the output validation module 20 may be initiated and called by the statistical analysis module 14 or statistical analysis device 36 to perform a scheduled validation or to validate results in real-time before executing a further action in the process 18.

Figure 6:
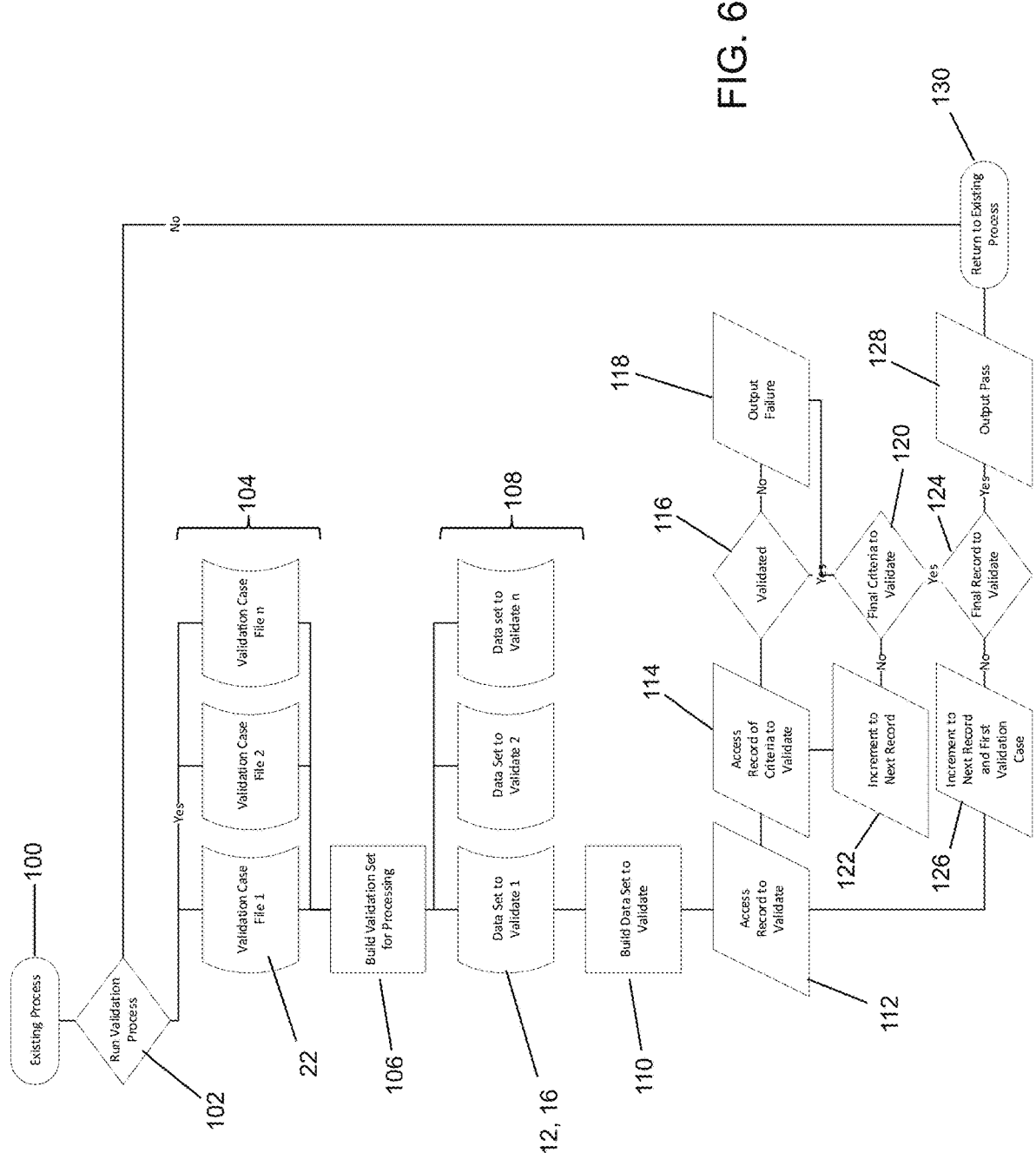

FIG. 6 provides an example implementation of the operations shown in FIG. 5. In this example embodiment, an existing process is running at block 100. This existing process can include any process, such as an execution of the statistical analysis module 14 or the process 18, that has data to be validated by the output validation module 20. At block 102 an option is provided for running the validation process. When this option is selected, a number of validation cases 22 are obtained at stage 104. In this example, the validation cases 22 are shown as a series of files 1, 2, . . . , n; illustrating that any number of validation cases 22 can be used to perform the validation process. At block 106 a validation set is built for processing. This may include assembling a list of test conditions 26 to be applied to each record or other portion of data being validated.

At stage 108, a number of data sets to be validated is defined, with each being evaluated against one or more validation cases 22. In this example, a series of data sets 1, 2, . . . , n is shown; illustrating that any number of data sets 12, 16 can be obtained for validation in stage 108. It may be noted that the process shown in FIG. 6 can be applied to statistical output 16 or incoming data 12 as discussed above. The data sets 12, 16 to be validated in stage 108 may be evaluated individually at block 110 as shown in FIG. 6 or may be combined and evaluated together depending on the test conditions 26 being applied and the data being analyzed.

At block 112, the output validation module 20 initiates a dual looping structure, which is an example implementation for block 84 shown in FIG. 5. Here the first (or next) record in the data set being validated is accessed. At block 114, the record(s) of the conditions to validate is/are obtained. This may include determining all of the test conditions 26 to apply against the data record currently being analyzed, as defined by the validation set. At block 116 the output validation module 20 determines if the data record is valid for the current test condition 26 being analyzed. If not, the output validation module 20 outputs a failure at block 118. If the data record is valid for the current test condition 26, the output validation module 20 determines at block 120 if the current test condition 26 is the final test condition 26 to validate for that data record. If not, the output validation module 20 increments to the next test condition 26 at block 122 and repeats blocks 114-120 until it is determined at block 120 that all criteria have been analyzed for validity.

When all criteria have been analyzed for validity, the output validation module 20 determines at block 124 if the current data record is the final data record to be analyzed. If not, the output validation module 20 increments to the next data record and repeats blocks 112-124 for the next data record. Once all data records have been analyzed, at block 128 the output validation module 20 outputs a pass result for the data set and returns to the existing process at block 130. It can be appreciated that the dual looping structure shown in FIG. 6 can be applied in parallel or serially to the other data sets to be validated that are shown in stage 108. In this way, the dual looping structure can be applied to a data set to determine if any of the data records of that type contain an error wherein the failure output at block 118 is indicated.

It can also be appreciated that the validation cases 22 determined in stage 104 may be predetermined, selected, or otherwise specified at the time of, or prior to, running the validation process at block 102. Such predetermined validation cases 22 may be specified by an owner of the data source 12, an operator of the statistical analysis module 14, a third party such as a regulatory or government body, or any other interested party.

Figure 7:
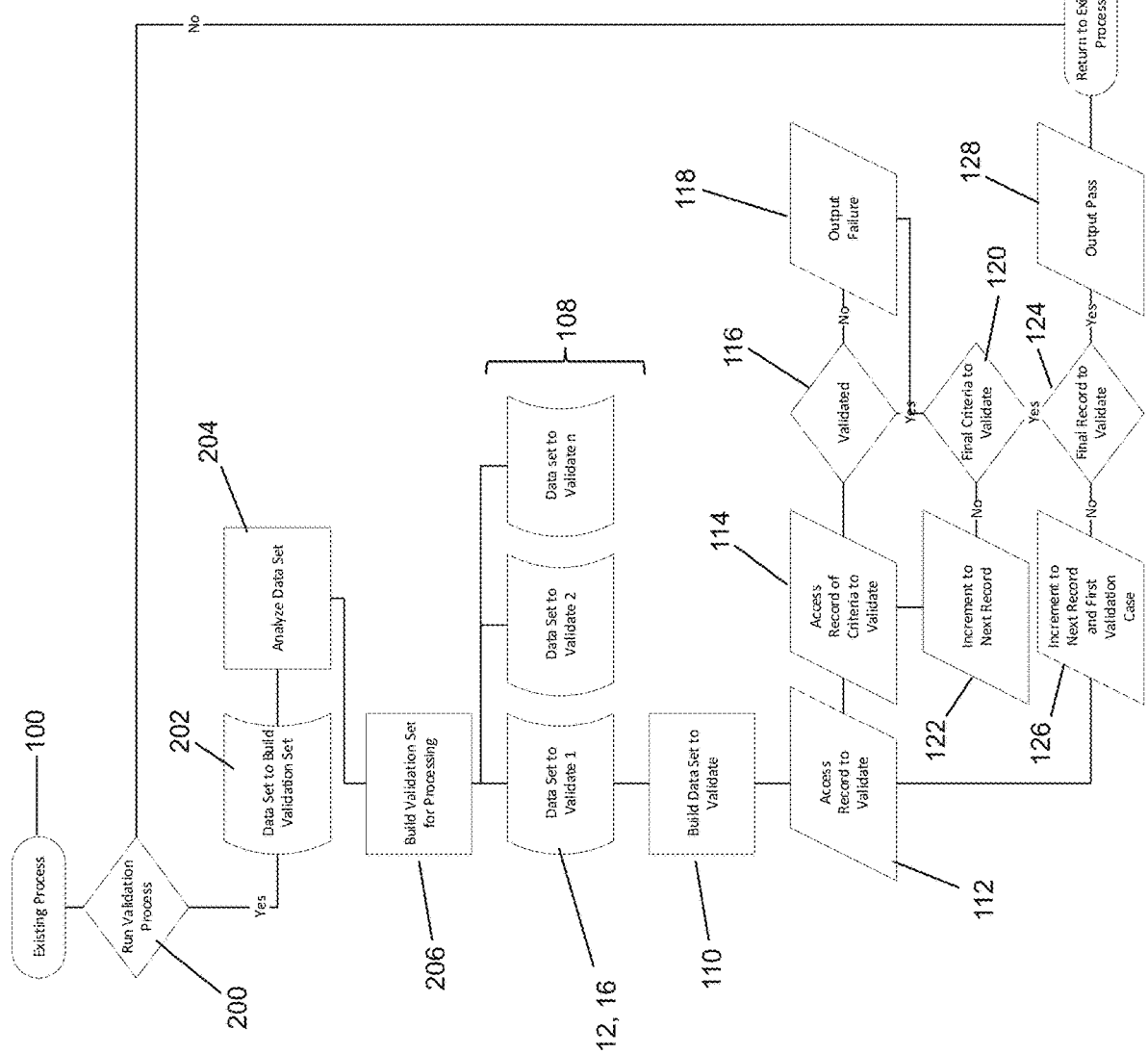

FIG. 7 provides another example embodiment for validating data using the output validation module 20, in a fully automated configuration. In this example embodiment, the fully automated validation process may be selected at block 200 for data associated with the existing process 100. In this example embodiment, the validation process 200 is executed to automatically determine the validation set to be applied to the data sets to be validated. When the validation process is initiated at block 200, a data set used to build the validation set is obtained at block 202. The data set is analyzed at block 204 to determine which validation cases 22, including which test conditions 26, are to be applied to the rest of the data. For example, the analyses conducted at block 204 can include applying a machine learning algorithm to the data set to determine test conditions 26 indicative of whether a data record is valid or not. The machine learning algorithm can be trained based on validation sets determined using the process shown in FIG. 6 or by applying a model based on the type of data being validated.

Once the validation set is built for processing at block 206, the data sets to be validated are determined at stage 108, and the dual looping structure described above can be applied beginning at block 110. The implementation of blocks 110-130 are described above and need not be reiterated here.

Figure 8:
FIG. 8 is a graphical illustration of a list of validation test results with all conditions passing.

An example of an output page 300 is shown in FIG. 8. In the example page 300, a validation output 304 is displayed for each validation case in a list of results 302. It can be seen that in this example all test conditions 26 passed the validation process.

Figure 9:
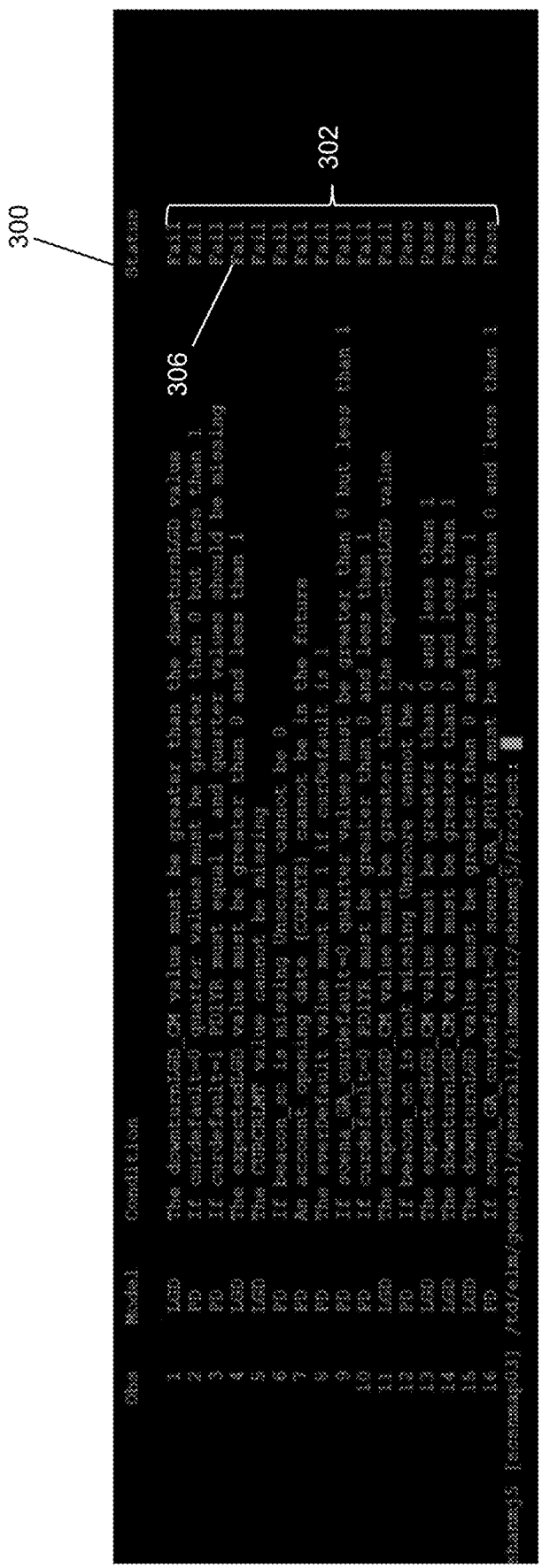
FIG. 9 is a graphical illustration of a list of validation test results having failed conditions.

Another example of an output page 400 is shown in FIG. 9. In the example page 400, a validation output 306 is shown that corresponds to a failed test condition 306.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A device for validating data, the device comprising:
   a processor;
   a data interface coupled to the processor; and
   a memory coupled to the processor, the memory storing computer executable instructions that when executed by the processor cause the device to:
   obtain, via the data interface, at least one data set to be validated using a validation set determined according to at least one test condition, wherein the at least one dataset is an output of at least one statistical analysis on at least one input data set;
   apply the validation set to the at least one data set to validate the data in the data set by, for at least one record in the at least one data set, validating the record according to the at least one test condition; and output a validation result for the data set.

2. The device of claim 1, wherein the computer executable instructions cause the device to:
in response to the validation result satisfying at least one criterion, transmit the at least one data set to a process for consumption.

3. The device of claim 1, wherein the validation set comprises at least one validation case, each validation case comprising at least one test condition.

4. The device of claim 1, wherein the computer executable instructions cause the device to:
transmit for adjusting, or adjust, the at least one statistical analysis based on the validation results.

5. The device of claim 1, wherein at least one validation case in the validation set is automatically derived by obtaining a sample data set, analyzing the sample data set, and identifying the at least one test condition from the analyzed sample data set.

6. The device of claim 1, wherein at least one validation case in the validation set is derived by providing a user interface to enable manual entry of the at least one test condition.

7. The device of claim 1, wherein at least one validation case in the validation set is obtained from a source, the source having previously derived the at least one test condition.

8. The device of claim 5, wherein the computer executable instructions further cause the device to:
obtain the sample data set;
analyze the sample data set; and
automatically identify all test conditions to be validated for the at least one data set to validate.

9. The device of claim 8, wherein the sample data set is analyzed by applying an automated process that uses a model derived using a machine learning process.

10. The device of claim 1, wherein the computer executable instructions further cause the device to:
generate a notification indicative of at least one failure to trigger an investigation of the at least one data set.

11. The device of claim 1, wherein validating the record comprises accessing a first record to be validated, incrementing through each of the at least one test condition to be validated for the first record and, for a second and any additional record to be validated, incrementing to a next record to increment through each of the at least one test condition.

12. The device of claim 11, wherein the validation results comprise a pass or fail indication output as the validating increments through values in the records.

13. The device of claim 1, wherein the data set is generated using financial data.

14. A method of validating data, the method executed by a device having a data interface coupled to a processor and comprising:
obtaining, via the data interface, at least one data set to be validated using a validation set determined according to at least one test condition, wherein the at least one dataset is an output of at least one statistical analysis on at least one input data set;
applying the validation set to the at least one data set to validate the data in the data set by, for at least one record in the at least one data set, validating the record according to the at least one test condition; and
outputting a validation result for the data set.

15. The method of claim 14, further comprising:
in response to the validation result satisfying at least one criterion, transmitting the at least one data set to a process for consumption.

16. The method of claim 14, wherein the validation set comprises at least one validation case, each validation case comprising at least one test condition.

17. The method of claim 14, further comprising:
transmitting for adjusting, or adjusting, the at least one statistical analysis based on the validation results.

18. The method of claim 14, wherein at least one validation case in the validation set is automatically derived by obtaining a sample data set, analyzing the sample data set, and identifying the at least one test condition from the analyzed sample data set.

19. The method of claim 14, wherein at least one validation case in the validation set is derived by providing a user interface to enable manual entry of the at least one test condition.

20. A non-transitory computer readable medium for validating data, the computer readable medium comprising computer executable instructions for:
obtaining, via a data interface, at least one data set to be validated using a validation set determined according to at least one test condition, wherein the at least one dataset is an output of at least one statistical analysis on at least one input data set;
applying the validation set to the at least one data set to validate the data in the data set by, for at least one record in the at least one data set, validating the record according to the at least one test condition; and
outputting a validation result for the data set.

* * * * *